(12) United States Patent
Kaminsky et al.

(10) Patent No.: US 8,313,640 B2
(45) Date of Patent: Nov. 20, 2012

(54) METHOD FOR REDUCING COKE FOULING IN A BURNER TIP

(75) Inventors: Mark P. Kaminsky, Friendswood, TX (US); Bala S. Devakottai, Sugar Land, TX (US); Sellamuthu G. Chellappan, Houston, TX (US)

(73) Assignees: Lyondell Chemical Technology, L.P., Houston, TX (US); Equistar Chemicals, LP

( * ) Notice: Subject to any disclaimer, the term of this patent is extended or adjusted under 35 U.S.C. 154(b) by 614 days.

(21) Appl. No.: 12/583,313

(22) Filed: Aug. 18, 2009

(65) Prior Publication Data

US 2011/0042273 A1 Feb. 24, 2011

(51) Int. Cl.
*F23G 7/07* (2006.01)
*C10G 9/16* (2006.01)
*C10G 75/04* (2006.01)

(52) U.S. Cl. .................. 208/48 R; 208/48 AA; 431/5
(58) Field of Classification Search ............. 208/48 R, 208/48 AA, 142–144; 431/5
See application file for complete search history.

(56) References Cited

U.S. PATENT DOCUMENTS

| 2,978,360 | A | * | 4/1961 | Bradstreet et al. | 123/669 |
| 4,666,587 | A | * | 5/1987 | Martin | 208/184 |
| 2004/0126727 | A1 | * | 7/2004 | Cho et al. | 431/354 |

* cited by examiner

*Primary Examiner* — Walter D Griffin
*Assistant Examiner* — Renee E Robinson

(57) ABSTRACT

A method for reducing coke fouling in a burner tip when a waste gas stream containing unsaturated hydrocarbons is combusted by coating the interior of the burner tip and/or impregnating the body of the burner tip with a hydrocarbon hydrogenation promoting catalyst and/or a combustion catalyst.

20 Claims, 1 Drawing Sheet the exposure of fresh hydrogenation and/or combustion

METHOD FOR REDUCING COKE FOULING IN A BURNER TIP

BACKGROUND OF THE INVENTION

1. Field of the Invention

This invention relates to the combustion at a burner tip of at least one waste gas stream containing at least one unsaturated or aromatic hydrocarbon that forms coke at the temperature of combustion of the waste gas stream.

More particularly, this invention relates to the reduction of coke fouling of a burner tip when combusting a waste gas stream containing at least one coke forming unsaturated or aromatic hydrocarbon.

2. Description of the Prior Art

Thermal cracking of hydrocarbons is a petrochemical process that is widely used to produce olefins such as ethylene, propylene, butenes, butadiene, and aromatics such as benzene, toluene, and xylenes.

An olefin production plant is generally composed of a cracking unit and a hydrocarbons purification unit.

In the cracking unit a hydrocarbonaceous feedstock such as ethane, naphtha, gas oil, or other fractions of whole crude oil or natural gas liquids is mixed with steam which serves as a diluent to keep the hydrocarbon molecules separated. This mixture, after preheating, is subjected to hydrocarbon thermal cracking using elevated temperatures (1,400 to 1,550 degrees Fahrenheit or F.) in a pyrolysis furnace. This thermal cracking is carried out without the aid of any catalyst.

The cracked product effluent of the pyrolysis furnace (furnace) contains hot, gaseous hydrocarbons of great variety (from 1 to 35 carbon atoms per molecule, or C1 to C35 inclusive, both saturated and unsaturated). This product contains aliphatics (alkanes and alkenes), alicyclics (cyclanes, cyclenes, and cyclodienes), aromatics, and hydrogen.

This furnace product is then subjected to further processing in the cracking unit to produce, as products of the olefin plant, various, separate and individual product streams such as hydrogen, ethylene, propylene, fuel oil, and pyrolysis gasoline. After the separation of these individual streams, the remaining cracked product contains essentially C4 hydrocarbons and heavier. This remainder is fed to a debutanizer wherein a crude C4 stream is separated as overhead while a C5 and heavier stream is removed as a bottoms product.

Pyrolysis furnaces are typically fired with a fuel gas that passes through a plurality of burner tips disposed with burners near the bottom of the pyrolysis furnace. In addition, the plant's fuel gas is burned in various boilers needed for the purification of the olefin and aromatic products. Besides olefin units, such fuel gas burners are used in various other chemical and refining units. This invention applies to all process units using fuel gas burner tips.

A desired fuel gas is natural gas or other fuel gases which are free of unsaturated hydrocarbons. However, from time to time it is necessary or desirable to burn in such furnaces waste gas streams generated elsewhere in the plant or other hydrocarbon processing facilities such as refineries. Substantial amounts of olefin or aromatic hydrocarbons may exist in such waste gas streams.

The temperature of combustion of the fuel gas at the burner tips in such pyrolysis furnaces can reach or exceed 2,000 F, and in so doing can form from unsaturated or polyaromatic hydrocarbons in the fuel gas stream a variety of coke species such as thermal coke, catalytic coke, carbidic and graphite coke and the like. These coke species can deposit on and in the burner tip, particularly low NOx burner tips.

Waste gas streams containing unsaturated hydrocarbons such as olefins (mono-olefins and/or poly-olefins) and aromatics tend to form coke on the burner tips at the combustion temperatures at which those burner tips operate. Coke formation on the burner tips fouls the burner tips thereby reducing their efficiency of combustion, and, ultimately, plugging the tips altogether.

When employing fouling waste gas streams which form coke at the burner tip, it is currently necessary to mix these streams with non-fouling (no unsaturated/aromatic hydrocarbon content) fuel gas to minimize the tendency to form coke at the burner tip. This degrades the combustibility characteristics of the clean fuel gas, and does not altogether eliminate the formation of coke at the burner tip.

It is desirable to be able to use fouling waste gas streams more fully since they are plentiful and low cost, and to do so without resorting to mixing with non-fouling, high grade fuel gas streams. In addition these non-fouling fuel gases typically are of a higher value, and, therefore, cost more per BTU of heat generated.

SUMMARY OF THE INVENTION

This invention provides a method for reducing coke formation at a burner tip when combusting a waste gas containing unsaturated hydrocarbons by coating the interior wall of the burner tip and/or impregnating the burner tip body with at least one catalyst that promotes the hydrogen saturation of unsaturated hydrocarbons.

DETAILED DESCRIPTION OF THE INVENTION

Figure 1:
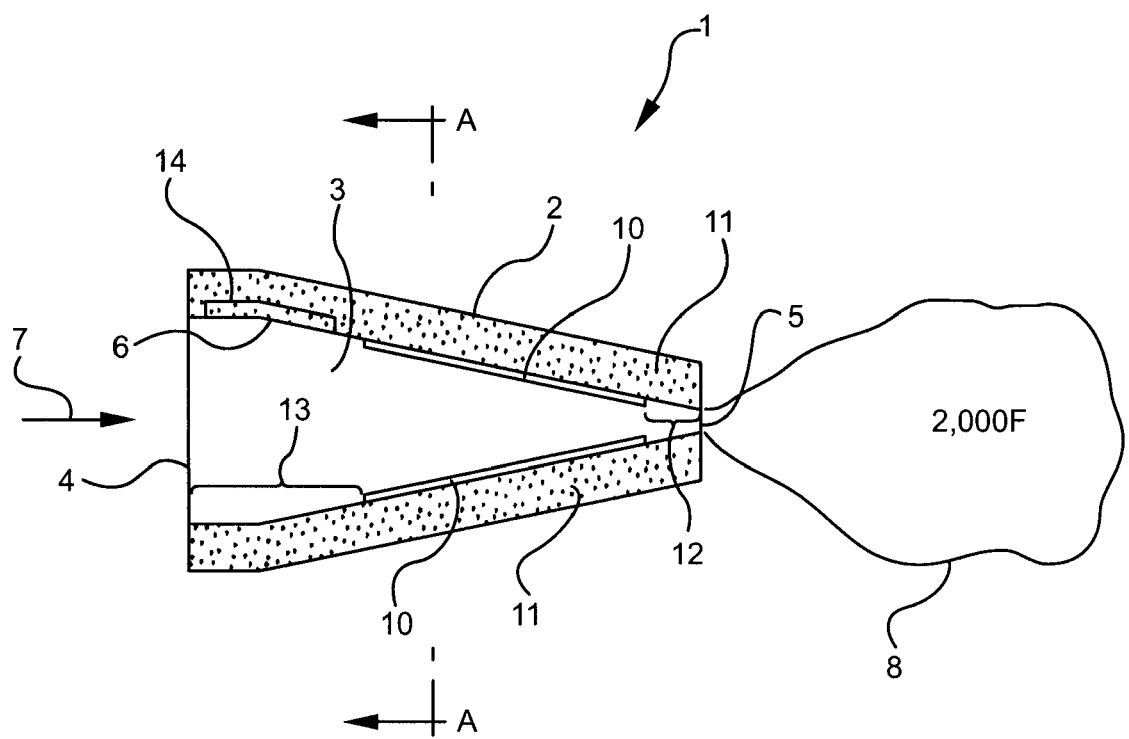
FIG. 1 shows a longitudinal cross-section of a burner tip employing one embodiment within this invention.
Figure 2:
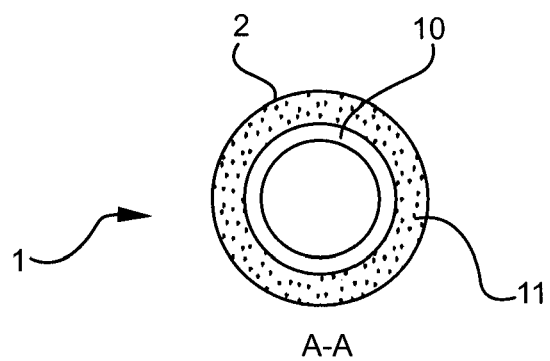
FIG. 2 shows a transverse cross-section of the burner tip of FIG. 1.

FIG. 1 shows a burner tip 1 having a body 2 that carries an internal channel 3. Channel 3 has an inlet end 4 and an opposing outlet end 5 thereby defining an interior surface 6 of said body that is physically exposed to a fuel gas stream 7 as it passes through channel 3 on its way to be combusted by way of flame 8 which is nominally at a temperature of about 2,000 F. Stream 7 is comprised of a combustible fuel such as natural gas mixed with oxygen, e.g., air.

In FIG. 1, pursuant to this invention, internal channel 3 is at least partially covered, preferably essentially fully covered, with a coating 10 of at least one catalytic material. The catalytic material employed in this invention can be one that promotes 1) the hydrogenation (hydrogen saturation) of any unsaturated hydrocarbons present in waste gas fuel stream 7, or 2) promotes the combustion of unsaturated hydrocarbons in waste gas fuel stream 7 or carbonaceous residue formed from waste gas fuel stream 7, or a mixture of such hydrogenation and combustion promoting catalysts.

Additional subdivided catalytic material 11 can be dispersed throughout the interior of body 2. Internally disposed catalyst 11 can be employed by itself in a burner tip or be employed in addition to catalyst coating 10 on the exterior of body 2. Catalyst 11 can solely be hydrogenation catalyst, solely combustion promoting catalyst, or a mixture of both catalysts.

The use of catalyst 11 in the interior of body 2 provides for the exposure of fresh hydrogenation and/or combustion enhancing catalyst 11 to stream 7 as inner surface 6 wears or otherwise erodes away due to prolonged use of the furnace (not shown).

Burner tip body 2 is typically made of stainless steel such as conventional 310 grade stainless.

Accordingly, catalyst 10 can be applied to inner surface 6 of body 2 in any convenient manner known for coating a metallic body 2 with a supported metal catalyst 10. Such application processes include compression or explosion cladding, ion implantation, wash coating, dip coating, vapor deposition, plasma deposition, and the like. Catalyst coating 10 can vary in thickness, e.g., from less than about 1 mil up to about 100 mils. Such coating processes are well known in the art and further description is not necessary to inform the art.

Pursuant to this invention, essentially the entire inner surface area 6 of burner tip 1 can be coated with a catalyst or mixture of catalysts or only a portion of area 6 coated as shown with coating 10 in FIG. 1. If, as shown in FIG. 1, only a medial portion of surface area 6 is coated with, for example, a hydrogenation catalyst or catalysts, near the forward portion 12 (outlet end) and/or rearward portion 13 (inlet end) of surface area 6 can be coated with a combustion catalyst (not shown in FIG. 1) or a mixture of hydrogenation and combustion catalyst (not shown in FIG. 1). Other combinations of hydrogenation and/or combustion catalyst employed on surface area 6 and/or within body 2 will be obvious to one skilled in the art once appraised of this invention, and are within the scope of this invention.

Catalyst 11 can be physically incorporated into body 2 during the fabrication of the material that makes up body 2, particularly when such material is in a molten or softened stage. Catalyst 11 can be physically incorporated into body 2 during its fabrication by forming pores or channels in body 2 during its fabrication and filling or coating those pores or channels with catalyst 11. The physical dispersion of catalyst throughout all or any portion of the interior of body 2 can be accomplished in a number of ways that will be obvious to those skilled in the art once made aware of the inventive concept of this invention. For example, a monolithic set of channels 14 coated on their interior with one or more catalysts of this invention can be employed at the inlet end 4 of burner tip body 2 to increase the contact of stream 7 with catalytic surface area.

Waste gas streams useful in this invention contain a significant amount of methane, and a substantial amount of in-situ hydrogen. Such streams contain on their own a sufficient amount of in-situ hydrogen to hydrogenate essentially all the unsaturated hydrocarbons initially present in the same stream. Such streams typically contain at least about 50 volume percent (vol. %) of a mixture of methane and hydrogen. Such a mixture can itself contain at least about 50 vol % methane and less than about 50 vol % hydrogen. All vol % are based on the total volume of that stream, i.e., stream 7.

The unsaturated hydrocarbon or mixture of unsaturated hydrocarbons present in a suitable waste gas stream can be present in an amount that is less than about 50 vol % based on the total volume of that stream, i.e., stream 7.

The unsaturated hydrocarbons typically present in a waste gas stream are mono-olefins, di-olefins, and aromatics having from 2 to 8 carbon atoms per molecule. Such materials include ethylene, propylene, butenes, pentenes, hexenes, isobutylene, benzene, toluene, butadiene, isoprene, and the like.

Additionally, the waste fuel stream is mixed with an oxidizer such as air in an amount sufficient to burn essentially all the fuel gas and thereby generate heat for the operation of the furnace, boiler, or the like.

The catalyst employed, whether it be catalyst 10 or catalyst 11 or both, is employed in an effective catalytic amount to promote the hydrogen saturation and/or combustion of at least part of the unsaturated hydrocarbons originally present in stream 7 as that stream passes through channel 3 and before it is combusted in flame 8, or the combustion of carbonaceous residue formed in channel 3. The catalyst can also be applied where the combustion takes place. This effective catalytic amount will vary widely depending on the unsaturated hydrocarbon content of stream 7, the particular catalyst or catalysts employed, whether that catalyst or group of catalysts is employed as a coating or embedded in the burner tip body or both, and the like, and, therefore, impossible to quantify. However, an effective catalytic amount to achieve at least some hydrogenation of unsaturated hydrocarbons, combustion of unsaturated hydrocarbons, and/or combustion of carbonaceous residue for a given waste fuel gas and burner tip application can readily be determined by one skilled in the art once the inventive concept of this invention is known.

The catalyst employed in this invention can vary widely since there are a number of materials known to promote the hydrogenation of unsaturated hydrocarbons. Generally, the hydrogenation promoting catalyst can contain at least one of the Group VIB (Cr, Mo, W) and/or Group VIII (Fe, Co, Ni, Ru, Rh, Pd, Ag, Au, Zn, Os, In, Pt) metals of the Periodic Table. The combustion promoting catalyst for unsaturated hydrocarbons and/or carbonaceous residue can include Cu, yttrium, yttria, and lanthanides such as ceria and neodymium oxides. The hydrogenation catalyst, combustion catalyst, and mixture(s) of hydrogenation and combustion catalyst can be employed as such on or in body 2, or as supported on a conventional catalyst support such as alumina, silica, titania, zirconia, magnesia, and the like.

EXAMPLE

A waste gas stream containing about 45.47 vol % methane, about 33.91 vol % hydrogen, and about 1 vol % of a mixture of ethylene, propylene, butenes, isobutylene, pentenes and benzene is employed as the fuel gas for burner tip 1 using a 2,000 F burner tip flame 8. The remainder of the waste gas stream comprises a mixture of ethane, propane, isobutane, n-butane, iso-pentane, n-pentane, cyclo-pentane, n-hexane, oxygen, nitrogen, and carbon monoxide.

Essentially the entire inner surface 6 of the burner tip is coated by plasma deposition with a mixture composed of about 0.01 to about 20 weight percent nickel and about 0.01 to about 30 weight percent molybdenum, this mixture being supported on alumina, titania or silica-aluminate, all weight percents based on the total weight of the supported mixture The unsaturated hydrocarbons in the waste gas stream are at least in part catalytically hydrogenated to partial and/or full saturation using the normal in-situ hydrogen content of that stream while that stream passes through channel 3 on its way toward flame 8. Combustion catalyst near the combustion zone can also accelerate the combustion of carbonaceous residues and prevent such residues from building up inside and/or on the burner tip.

We claim:

1. A method for reducing coke fouling of a burner tip when combusting a waste gas stream, said burner tip comprising a body having an inlet end and an outlet end, an internal channel within said body connecting said inlet and outlet ends and exposing an interior surface of said body to said internal channel, said waste gas stream being passed through said internal channel from said inlet end and combusted at said outlet end, said method comprising providing at least one waste gas stream containing a substantial amount of a mixture of methane, oxygen, and insitu molecular hydrogen and a minor amount of at least one unsaturated hydrocarbon that forms coke at the temperature of combustion of said waste gas stream, at least one of coating said interior surface and impregnating said body with an effective catalytic amount of at least one of a hydrogenation catalyst that promotes the hydrogen saturation of said at least one unsaturated hydrocarbon and a combustion catalyst that promotes the combustion of said at least one unsaturated hydrocarbon and carbonaceous residue, and combusting said waste gas stream using said catalyst carrying burner tip, wherein said interior surface of said body is coated with said hydrogenation catalyst so that said coating is in physical contact with said waste gas stream passing through said interior channel.

2. The method of claim 1 wherein said body is composed of stainless steel.

3. The method of claim 1 wherein at least a part of said combustion promoting catalyst is employed at said outlet end of said burner tip.

4. The method of claim 1 wherein said mixture of methane and in-situ molecular hydrogen comprises at least 50 volume percent of said waste gas stream, and said at least one unsaturated hydrocarbon comprises less than 50 volume percent of said waste gas stream.

5. The method of claim 1 wherein said mixture of methane and in-situ molecular hydrogen contains at least about 50 volume percent methane and less than 50 volume percent molecular hydrogen.

6. The method of claim 1 wherein said at least one unsaturated hydrocarbon is at least one material selected from the group consisting of mono-olefin, di-olefin, and aromatic hydrocarbons having from 2 to 8 carbon atoms per molecule.

7. The method of claim 1 wherein said hydrogenation catalyst contains an effective hydrogenation catalytic amount of at least one metal selected from Group VIB and Group VIII of the Periodic Table.

8. The method of claim 7 wherein said hydrogenation catalyst metal is supported on at least one of alumina, silica, titania, zirconia, lanthana, and magnesia.

9. The method of claim 1 wherein said hydrogenation catalyst is at least one material selected from the group consisting of chromium, molybdenum, tungsten, zinc, silver, gold, cobalt, nickel, palladium, and platinum, and said combustion catalyst is at least one material selected from the group consisting of copper, ceria, yttria, and neodymium oxide.

10. The method of claim 1 wherein a set a channels is carried within said body adjacent said inlet end, said channels carrying at least one of said hydrogenation catalyst and combustion catalyst.

11. A method for reducing coke fouling of a burner tip when combusting a waste gas stream, said burner tip comprising a body having an inlet end and an outlet end, an internal channel within said body connecting said inlet and outlet ends and exposing an interior surface of said body to said internal channel, said waste gas stream being passed through said internal channel from said inlet end and combusted at said outlet end, said method comprising providing at least one waste gas stream containing a substantial amount of a mixture of methane, oxygen, and insitu molecular hydrogen and a minor amount of at least one unsaturated hydrocarbon that foams coke at the temperature of combustion of said waste gas stream, at least one of coating said interior surface and impregnating said body with an effective catalytic amount of at least one of a hydrogenation catalyst that promotes the hydrogen saturation of said at least one unsaturated hydrocarbon and a combustion catalyst that promotes the combustion of said at least one unsaturated hydrocarbon and carbonaceous residue, and combusting said waste gas stream using said catalyst carrying burner tip, wherein said body is impregnated with said hydrogenation catalyst so that as said burner tip wears away fresh hydrogenation catalyst is exposed to said waste gas stream.

12. The method of claim 11 wherein said body is composed of stainless steel.

13. The method of claim 11 wherein at least a part of said combustion promoting catalyst is employed at said outlet end of said burner tip.

14. The method of claim 11 wherein said mixture of methane and insitu molecular hydrogen comprises at least 50 volume percent of said waste gas stream, and said at least one unsaturated hydrocarbon comprises less than 50 volume percent of said waste gas stream.

15. The method of claim 11 wherein said mixture of methane and insitu molecular hydrogen contains at least about 50 volume percent methane and less than 50 volume percent molecular hydrogen.

16. The method of claim 11 wherein said at least one unsaturated hydrocarbon is at least one material selected from the group consisting of mono-olefin, di-olefin, and aromatic hydrocarbons having from 2 to 8 carbon atoms per molecule.

17. The method of claim 11 wherein said hydrogenation catalyst contains an effective hydrogenation catalytic amount of at least one metal selected from Group VIB and Group VIII of the Periodic Table.

18. The method of claim 17 wherein said hydrogenation catalyst metal is supported on at least one of alumina, silica, titania, zirconia, lanthana, and magnesia.

19. The method of claim 11 wherein said hydrogenation catalyst is at least one material selected from the group consisting of chromium, molybdenum, tungsten, zinc, silver, gold, cobalt, nickel, palladium, and platinum, and said combustion catalyst is at least one material selected from the group consisting of copper, ceria, yttria, and neodymium oxide.

20. The method of claim 11 wherein a set a channels is carried within said body adjacent said inlet end, said channels carrying at least one of said hydrogenation catalyst and combustion catalyst.

* * * * *